United States Patent
Claris

(10) Patent No.: US 11,241,653 B2
(45) Date of Patent: Feb. 8, 2022

(54) INERT GAS GENERATOR FOR AN INERTING SYSTEM OF AN AIRCRAFT SYSTEM OF AN AIRCRAFT FUEL TANK, AND INERTING METHOD

(71) Applicant: ZODIAC AEROTECHNICS, Roche la Moliere (FR)

(72) Inventor: Christophe Claris, Saint-Etienne (FR)

(73) Assignee: ZODIAC AEROTECHNICS, Roche la Moliere (FR)

( * ) Notice: Subject to any disclaimer, the term of this patent is extended or adjusted under 35 U.S.C. 154(b) by 102 days.

(21) Appl. No.: 16/686,725

(22) Filed: Nov. 18, 2019

(65) Prior Publication Data

US 2020/0164307 A1    May 28, 2020

(30) Foreign Application Priority Data

Nov. 23, 2018 (FR) ...................................... 1871792

(51) Int. Cl.
  *B01D 53/30*   (2006.01)
  *B01D 53/22*   (2006.01)
  *B64D 37/32*   (2006.01)

(52) U.S. Cl.
  CPC .......... *B01D 53/30* (2013.01); *B01D 53/227* (2013.01); *B64D 37/32* (2013.01); *B01D 2053/221* (2013.01)

(58) Field of Classification Search
  None
  See application file for complete search history.

(56) References Cited

U.S. PATENT DOCUMENTS

| 8,801,831 | B1 | 8/2014 | Snow, Jr. et al. | |
| 2003/0233936 | A1 | 12/2003 | Crome | |
| 2007/0054610 | A1* | 3/2007 | Jensen | B64D 37/32 |
| | | | | 454/74 |
| 2016/0214732 | A1* | 7/2016 | Vigliotta | B01D 53/227 |
| 2017/0239615 | A1* | 8/2017 | Claris | B64D 37/32 |

OTHER PUBLICATIONS

Search Report issued in French Patent Application No. 1871792 dated Oct. 14, 2019.

* cited by examiner

*Primary Examiner* — Jason M Greene
(74) *Attorney, Agent, or Firm* — Marshall, Gerstein & Borun LLP

(57) ABSTRACT

A generator of inert gas from an airflow, in an inerting system for at least one aircraft fuel tank is disclosed. The generator includes a system with an air inlet and means for distributing the airflow to a plurality of air separation modules arranged in parallel on the air system to deplete oxygen in the air and generate a nitrogen-enriched inert gas at the outlet. The generator also includes a programed control unit for the distribution means to selectively supply air to a single, a portion or all of the air separation modules, depending on the flight phase of the aircraft.

8 Claims, 3 Drawing Sheets

INERT GAS GENERATOR FOR AN INERTING SYSTEM OF AN AIRCRAFT SYSTEM OF AN AIRCRAFT FUEL TANK, AND INERTING METHOD

TECHNICAL FIELD

This disclosure relates to the art of inert gas generation systems, notably used in inerting systems for at least one fuel tank of an aircraft such as an airplane, a helicopter or similar.

BACKGROUND OF THE DISCLOSURE

In the field of aeronautics, the use of inerting systems is well known to generate an inert gas, such as nitrogen or any other inert gas such as carbon dioxide, and for injecting said inert gas into fuel tanks for safety reasons in order to reduce the risk of explosion of said tanks.

Generally speaking, an inert gas generator comprises a system with an air inlet and the means for distributing the airflow to a plurality of air separation modules arranged in parallel on the air system to deplete oxygen in the air and generate a nitrogen-enriched inert gas at the outlet.

Current inerting systems enable inert gas whose level of inflammability is incompatible with the certification rules in the field of aviation, which are well-known to a person skilled in the art, to be introduced into fuel tanks.

In practice, inerting systems are sized to introduce a quantity of inert gas calculated according to a specific operating point of the aircraft, notably during the descent phase at 4,000 feet.

This specific operating point enables the requirements for the flow rate and purity of the inert gas to be calculated, and to deduce from this the number and type of air separation modules required. Apart from this point for sizing the aircraft, the fuel tanks require less inert gas.

It follows from the above that, for some flight phases, the inert gas generator implemented in the current prior art is oversized compared to the actual requirements for inert gas. The same applies to the filter elements and other components of the inerting system, which increases the weight, consumption and cost of the inerting system during these flight phases.

SUMMARY OF THE DISCLOSURE

One of the objectives of the disclosed embodiments is therefore to overcome the disadvantages of the prior art by providing an inert gas generator, as well as an inerting method, that optimizes the size and use of an inerting system in order to reduce its consumption and cost of use.

Another objective is also to provide such an inert gas generator comprising components with a longer life span.

To this end, a generator has been developed that generates inert gas from an airflow, notably incorporated into an inerting system for at least one aircraft fuel tank, the generator comprising a system with an air inlet and the means for distributing the airflow to a plurality of air separation modules arranged in parallel on the air system to deplete oxygen in the air and generate a nitrogen-enriched inert gas at the outlet.

The inert gas generator comprises a programed control unit of the distribution means for selectively supplying air to a single, a portion of or all the air separation modules, depending on the flight phase of the aircraft.

In this way, use of the air separation modules is linked to the actual requirement for inert gas, which requirement is notably determined by the flight phase of the aircraft. Thus, the inert gas generator consumes the quantity of air needed to meet the requirement for inert gas. All overconsumption is avoided. The disclosed embodiments thus enable the operating costs of the system and the inert gas generator to be reduced, and also reduces wear and tear, thus increasing the life span of the components in the inert gas generator.

For example, the control unit is programed to supply air to a single air separation module when the aircraft in the cruise phase, and to a single or to a portion of the modules when the aircraft is in the climb phase.

Likewise, the control unit is preferably programed to supply air to a plurality or to all of the air separation modules when the aircraft is in the descent phase.

On the basis of this concept, several embodiments, either alone or in combination, have been designed.

For example, according to one particular embodiment, when a single or a portion of the air separation modules are supplied with air, the control unit is programed to supply air to the air separation module(s) with the lowest number of accumulated operating hours among the plurality of air separation modules.

According to another embodiment, when a single or a portion of the air separation modules are supplied with air, the control unit is programed to supply air to the best performing air separation module(s) among the plurality of air separation modules, i.e. with the lowest level of oxygen in the inert gas generated.

The performance of the air separation modules can be measured when the aircraft is in the descent phase, on the ground or in the cruise phase.

Advantageously, the inert gas generator comprises at least one oxygen analyzer, and the means to direct the inert gas at the outlet of each air separation module to the oxygen analyzer to measure the performance of each air separation module independently of one another.

This feature enables the purity of the inert gas at the outlet of each air separation module to be checked, and to choose which of the air separation modules should be used if this is based on the performance criterion. This feature also enables to check the performance of air separation modules one by one, for example when the aircraft is in the cruise phase, on the ground or in the descent phase, so that provision can then be made to change an air separation module that, for example alone, is performing inadequately. In the prior art, it is currently impossible to test the performance of each air separation module independently, such that when losses of performance are detected, the entire assembly of air separation modules, which comprises between two and five, or even more, modules often has to be changed.

In another embodiment, used alone or in combination with those described, when a single or a portion of the air separation modules are supplied with air, the control unit is programed to alternate at a specified time interval the air supply to the air separation module(s) among the plurality of air separation modules.

In this configuration, the embodiments can switch between the various air separation modules, after a specified period of use, to even out wear and tear of the various air separation modules, for example by switching to the following modules, the best-performing modules or the modules with the lowest number of accumulated operating hours.

Thus, the use and wear and tear of the various air separation modules can be evened out.

According to one particular embodiment, the airflow distribution means are in the form of a suitable valve, for example multi-channel, which can then direct the airflow to one or more air separation modules.

According to another embodiment, the airflow distribution means are in the form of a plurality of valves, notably the same number of valves as air separation modules, each arranged upstream of an air separation module.

Thus, depending on whether the valves are used singly, in part or all together, the airflow can be directed to a single, a portion, or all of the air separation modules.

Advantageously, to avoid any air recirculation when certain air separation modules are not used, the inert gas generator comprises check valves positioned at each the outlet of each air separation module.

The disclosure also relates to an inerting method for an aircraft fuel tank by means of an inert gas generator such as that described above. The method is remarkable in that it consists of selectively supplying air to a single, several or all of the air separation modules, depending on the flight phase of the aircraft.

BRIEF DESCRIPTION OF THE FIGURES

Further advantages and features will become clearer from the following description, given by way of a non-limiting example, of the inert gas generation system, with reference to the accompanying drawings in which.

DETAILED DESCRIPTION

Figure 1:
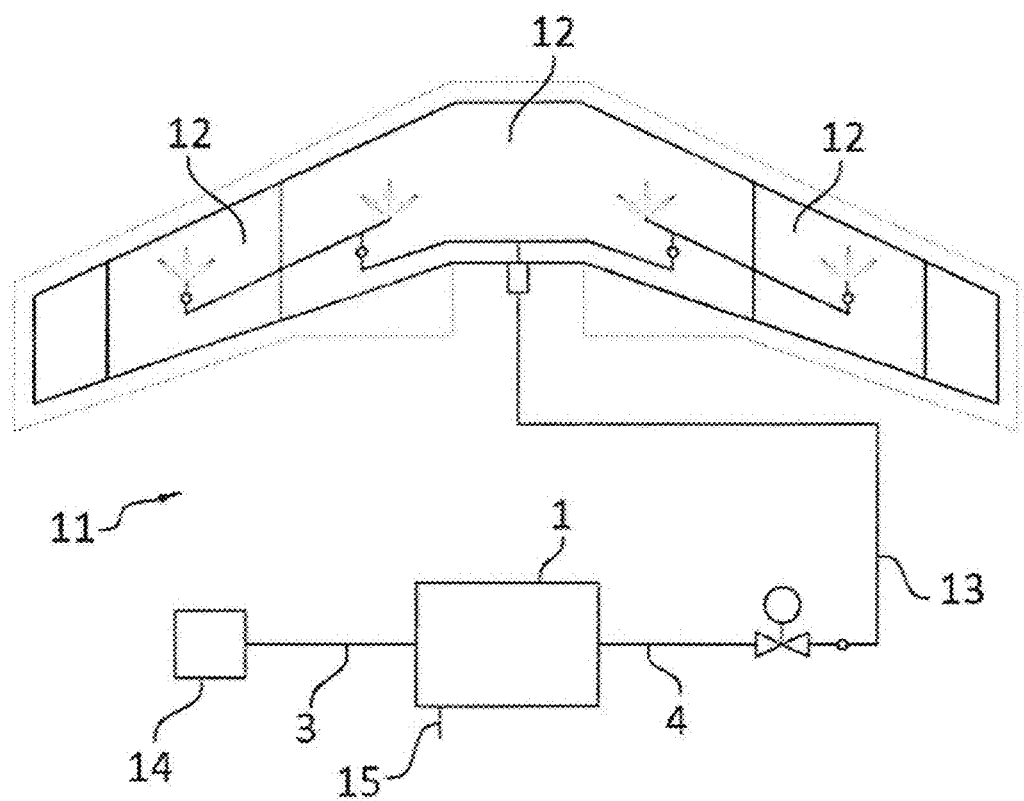
FIG. 1 is a schematic representation of an inerting system for an aircraft fuel tank.

With reference to FIG. 1, the disclosure relates to an inert gas generator (1) comprising an air system (2) to deplete oxygen in order to generate a nitrogen-enriched inert gas.

The generator (1) is notably intended to be used in an inerting system (11) for at least one aircraft fuel tank (12). To this end, the inert gas generator (1) comprises an air inlet (3) supplied with bleed air diverted from at least one engine and/or air from a passenger cabin and/or air from outside the aircraft via an air preparation system (14) that may be subjected to a compressor, and an inert gas outlet (4) connected to insert gas distribution means (13) in the fuel tank(s) (12). The generation system (1) also comprises an oxygen-enriched gas outlet (15).

The inerting system (11) allows an inert gas to be generated and introduced into said aircraft fuel tank(s) (12) for safety reasons in order to reduce the risk of explosion of said tanks. The injected inert gas aims to render the fuel tank(s) (12) inert, i.e. allows the level of oxygen present within said tank(s) to be reduced, and notably to maintain this level below a certain threshold, preferably less than 12%.

With reference to FIGS. 2 to 5, the inert gas generator (1) comprises a plurality of air separation modules (2), i.e. at least two, and preferably at least three, arranged in parallel on the air system.

The air separation modules (2), comprise for example polymer membranes through which the pressurized air is injected such as to obtain both an inert gas with a high nitrogen content, and an inert gas with a high oxygen content.

Furthermore, the inert gas generator (1) comprises airflow distribution means (5), positioned upstream of the air separation modules (2). The insert gas generator (1) comprises a control unit (6), such as for example an electronic board with built-in software, enabling the distribution means (5) to be controlled and managed.

More specifically, the control unit (6) is programmed to control the distribution means (5) in order to selectively supply a single, a portion or all of the air separation modules (2), depending on the flight phase of the aircraft. Data relating to the flight phase of the aircraft is recovered by the control unit using any suitable means, and is for example transmitted directly by the on-board computer of the aircraft.

The embodiments thus enable the number of air separation modules (2) to be adjusted so that they are used according the actual requirement for inert gas to be injected into the fuel tanks (12), which varies according to the flight phase of the aircraft.

Figure 2:
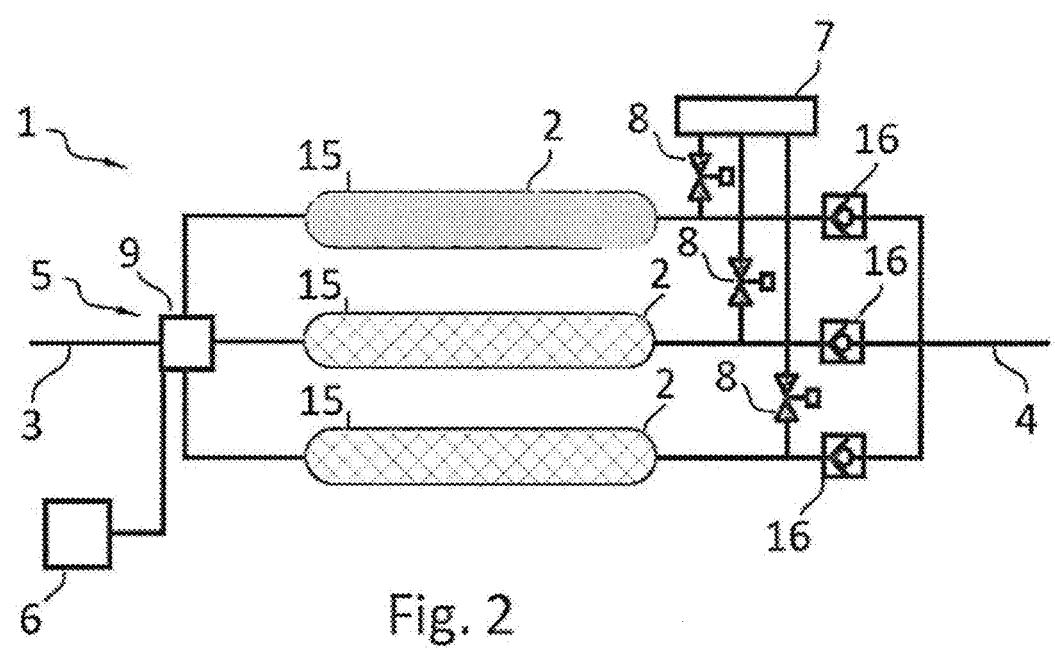
FIG. 2 is a schematic representation of an inert gas generator, the distribution means being controlled to supply air to a single air separation module.
Figure 3:
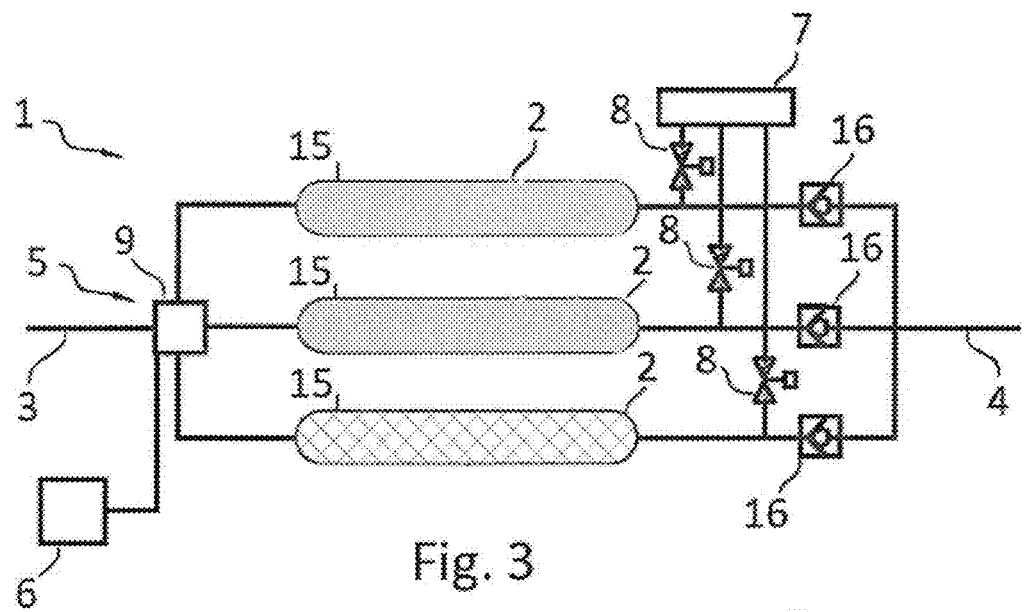
FIG. 3 is a schematic representation similar to that in FIG. 2, the distribution means being controlled to supply air to a portion of the air separation modules.
Figure 4:
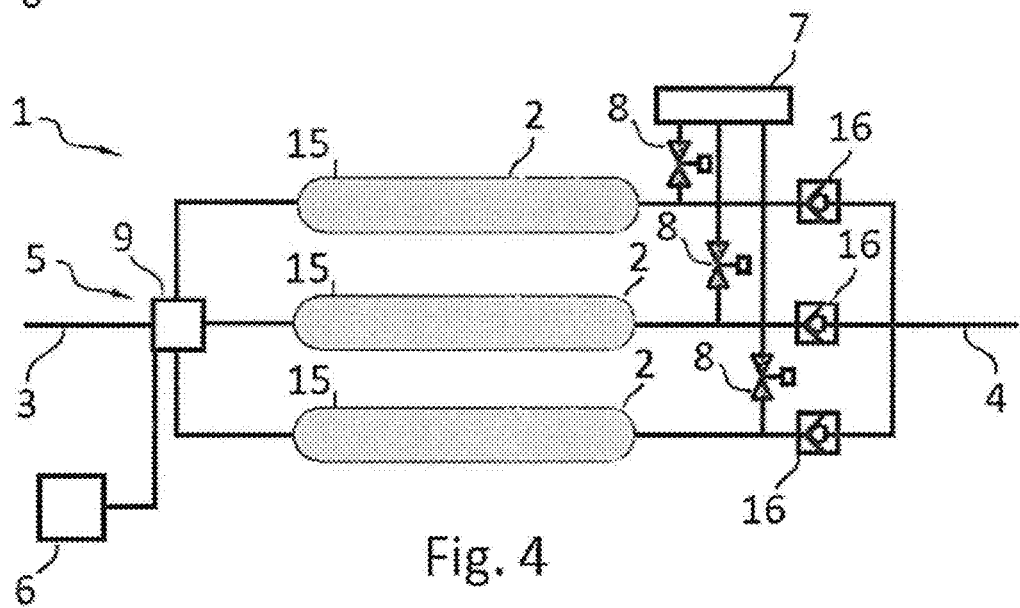
FIG. 4 is a schematic representation similar to that in FIG. 2, the distribution means being controlled to supply air to all of the air separation modules.

For example, the control unit (6) can be programmed to supply air to a portion of the air separation modules (2), and preferably to a single air separation module (2) when the aircraft is in the cruise or climb phase, see FIGS. 2 and 3, whereas it can be programmed to supply air to a plurality and preferably to all of the air separation modules (2) when the aircraft is in the descent phase, see FIG. 4.

It follows from the above that the disclosed embodiments also enable the total number of hours during which the air separation modules (2) are used to be reduced since, in some cases, certain modules (2) will not be used.

It follows that the disclosed embodiments enable the size of the inerting system (11) to be optimized and hence to significantly reduce the airflow consumed by the inert gas generator (1), and even to optimize the size of the exchangers and the filter elements. Accordingly, this obviously enables the cost of operating the inerting system (11), and also the risk of overpressure and overtemperature in the fuel tanks (12), to be reduced.

On the basis of this concept, the control unit (6) is advantageously programed when a single or a portion of the air separation module(s) (2) are supplied with air, to supply air to the air separation modules (2) among the plurality of air separation modules (2) with the lowest number of accumulated operating hours. Thus, the air separation modules (2) are chosen by the control unit (6) and used according to their number of accumulated operating hours, which evens out wear and tear of the various air separation modules (2) and hence optimizes their life span. For example, this enables an aircraft in the cruise or climb phase to switch between the various air separation modules (2). This makes the active inerting system longer lasting and cheaper.

According to another embodiment, when a single or a portion of the air separation modules (2) are supplied with air, the control unit (6) is preferably programed to supply air to the best performing, i.e. with the lowest level of oxygen in the inert gas generated, air separation module(s) (2) among the plurality of air separation modules (2).

In order to assess the performance of each air separation module (2), the inert gas generator (1) comprises at least one oxygen analyzer (7), and means, notably pipes and possibly valves (8), to direct the inert gas at the outlet of each air separation module (2) to the oxygen analyzer (7). This enables the performance of each air separation module (2) to be measured independently of one another.

This performance measurement can be carried out during a flight, for example in the descent phase, or on the ground. This enables the performance of each of the air separation modules (2) to be known and to alternate their use according to this performance.

According to one particular embodiment, notably illustrated in FIGS. 2 to 4 the airflow distribution means (5) are for example in the form of a multi-channel valve (9), positioned upstream of all the air separation modules (2), adapted to selectively direct the airflow to a single, a portion or all of the air separation modules (2).

Figure 5:
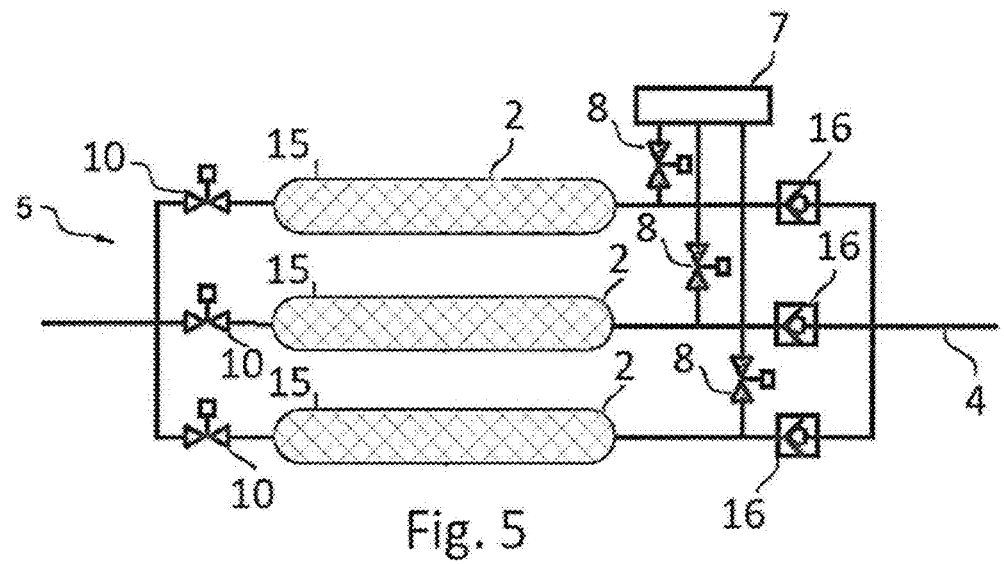
FIG. 5 is a schematic representation of another embodiment of the inert gas generator, wherein the airflow distribution means are in the form of a plurality of valves, each positioned upstream of an air separation module.

In another embodiment, notably illustrated in FIG. 5, each air separation module (2) is connected, upstream, to a valve (10), which by actuating each of the valves (10), enables air to be supplied selectively to a single, a portion or all of the air separation modules (2). Furthermore, the inert gas generator comprises check valves (16) positioned at the outlet of each air separation module.

Figure 6:
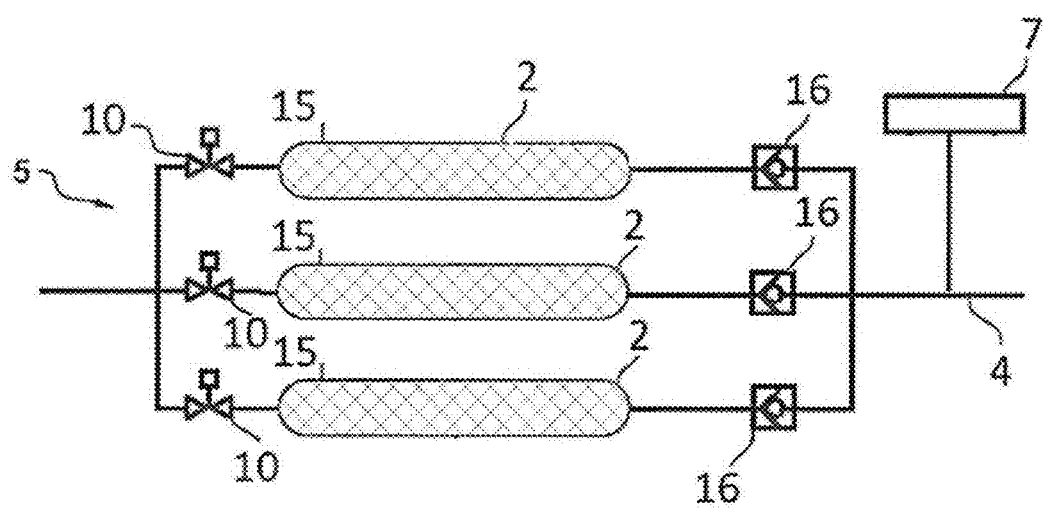
FIG. 6 is a schematic representation similar to that in FIG. 5, without a valve upstream of the oxygen analyzer.

Whether with the multi-channel valve (9) or with the plurality of valves (10), the presence of the valves (8) downstream of the air separation module (2) is not essential, as shown in FIG. 6.

The control unit (6) thus manages the airflow distribution means (5) to use and supply selectively the air separation modules (2), depending on the flight phase of the aircraft. When a single or a portion of the air separation modules (2) has to be used, the control unit (6) chooses the modules (2) that must be used according to several criteria, such as for example according to performance, wear and tear, the number of accumulated operating hours, or simply according to how long they have been used, in order to switch from one separation module (2) to another after a certain operating time, for example one hour.

Combinations of these criteria can, of course, be envisaged. Such as for example, the control unit (6) can choose the module (2) with the lowest number of accumulated operating hours and, if two modules (2) have the same number of accumulated operating hours, the control unit (6) can choose the best performing of these two modules (2). At the end of a certain operating time, the chosen module (2) can then be replaced with another module (2) according to the same criteria.

The concept behind the contemplated embodiments lies in choosing the number of air separation modules (2) according to the flight phase. This enables the size of the inerting system (11) to be adjusted according to the actual requirement for inert gas in the fuel tanks (12). Nevertheless, the criteria for choosing the various modules (2) could be applied, without worrying about the flight phase. For example, the choice of modules (2) could be determined solely by wear and tear, performance, or the time period of actual use (time delay), in order to even out wear and tear of the various air separation modules (2).

The disclosed embodiments also consist of an inerting method for an aircraft fuel tank by means of an inert gas generator (1) such as that described above. The method is remarkable in that it consists of selectively supplying air to a single, a portion or all of the air separation modules (2), depending on the aircraft flight phase and according to the various criteria for selecting the air separation modules (2).

The invention claimed is:

1. A generator of inert gas from an airflow, in an inerting system for at least one aircraft fuel tank, the generator comprising:
    a system with an air inlet; and
    means for distributing the airflow to a plurality of air separation modules arranged in parallel on the air system to deplete oxygen in the air and generate a nitrogen-enriched inert gas at an outlet;
    a control unit of the distribution means programed for selectively supplying air to a single, a portion or all of the air separation modules according to a flight phase of the aircraft,
    wherein when a single or a portion of the air separation modules are supplied with air, the control unit is programmed to supply air, among the plurality of air separation modules, to (i) the air separation module with a lowest number of accumulated operating hours, or (ii) the best-performing air separation module, and
    wherein the generator further comprises:
    at least one oxygen analyzer; and
    means to direct the inert gas at the outlet of each air separation module to the oxygen analyzer to measure the performance of each air separation module independently of one another.

2. A generator according to claim 1, wherein the control unit is programed to supply air to a single air separation module when the aircraft is in a climb or cruise phase.

3. A generator according to claim 1, wherein the control unit is programed to supply air to all of the air separation modules when the aircraft is in a descent phase.

4. A generator according to claim 1, wherein when a single or a portion of the air separation modules are supplied with air, the control unit is programed to alternate at a specified time delay the air supply to the air separation module among the plurality of air separation modules.

5. A generator according to claim 1, wherein the airflow distribution means are in the form of a multi-channel valve.

6. A generator according to claim 1, wherein the distribution means are in the form of a same number of valves as air separation modules, each of the valves being arranged upstream of an air separation module.

7. A generator according to claim 1, wherein the generator comprises a check valve at the outlet of each air separation module.

8. A method for inerting an aircraft fuel tank by means of a generator of inert gas from an airflow, the method comprising:
    in an air system having an air inlet and an inert gas outlet, supplying air selectively to a single, a portion, or all of a plurality of air separation modules arranged in parallel on the air system, depending on a flight phase of the aircraft, the air separation modules depleting oxygen in the air and generating a nitrogen-enriched inert gas at the outlet, and
    directing the inert gas at the outlet of each air separation module to one or more oxygen analyzers,
    measuring, with the one or more oxygen analyzers, the performance of each air separation module independently of one another.

* * * * *